March 17, 1953
H. HURVITZ
2,632,036
PANORAMIC RECORDER
Filed July 15, 1948
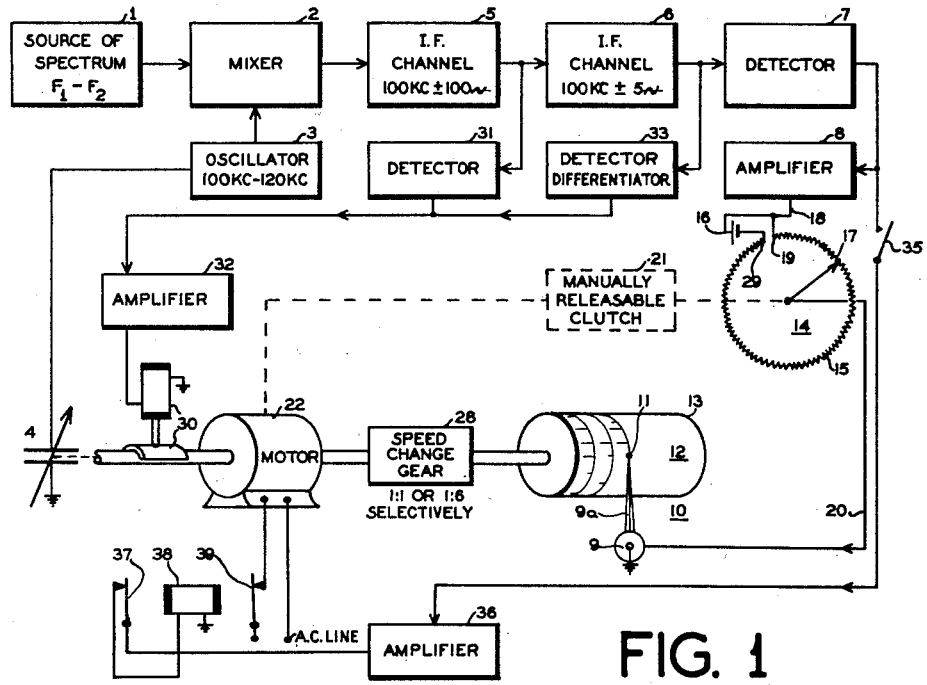
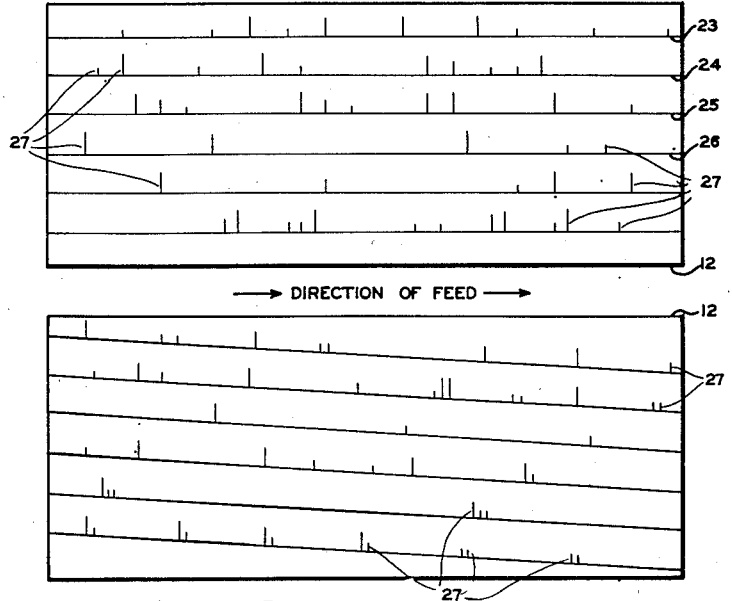
FIG. 1
FIG. 2
FIG. 3
INVENTOR
Hyman Hurvitz

Patented Mar. 17, 1953

2,632,036

UNITED STATES PATENT OFFICE 2,632,036

PANORAMIC RECORDER

Hyman Hurvitz, Washington, D. C., assignor to
Marcel Wallace, doing business as Panoramic
Laboratories, East Portchester, Conn.

Application July 15, 1948, Serial No. 38,883

14 Claims. (Cl. 175—183)

This application represents an improvement of an invention disclosed in an application for United States Patent, Serial #11,265, filed in the name of Marcel Wallace on February 26, 1948, for Variable Selectivity Panoramic Systems, and now United States Patent No. 2,590,809, issued March 25, 1952, and of a further application for United States patent filed in the name of the present inventor on February 6, 1948, for Panoramic Systems, to which has been assigned Serial #6,624, now Patent No. 2,507,525, issued May 16, 1950.

The invention relates generally to panoramic systems for detecting and displaying a frequency spectrum, by a process of progressive analysis of the frequency content of the spectrum.

Still more particularly, the present invention relates to recording spectrum analyzers, and especially spectrum anaylzers which are adapted for the analysis of signals in the so-called audio spectrum.

The general character of panoramic spectrum analyzers is well known to the art, involving generally an input circuit for translating the spectrum of frequencies to be analyzed, a wide band mixer to the input of which is applied the spectrum of frequencies to be analyzed, a source of local oscillations for application to the mixer to effect heterodyning of the spectrum of frequencies, a narrow band intermediate frequency amplifier coupled to the output of the mixer, which accepts only a relatively small part of the total frequency spectrum to be analyzed, and means for frequency modulating or scanning the source of local oscillations to effect translation of successive portions of the frequency spectrum to be analyzed into the I. F. amplifier, in sequence. The action of the system is, then, effectively to sweep the wide band frequency spectrum to be analyzed past the narrow band I. F. amplifier, the latter abstracting from the frequency spectrum in succession small increments of signal distributed along the spectrum. The signals present in the I. F. amplifier may be detected, and the resulting signals amplified, and applied to modulate or deflect the cathode ray beam of a cathode ray tube oscilloscope, a sweep voltage proportional to the frequency of the local oscillator being simultaneously applied to the beam, to provide a frequency base against which signal representative modulations or deflections may be observed.

Systems of the above character have been described in United States Patent #2,381,940, issued to M. Wallace, and patents referred to therein.

For many purposes, the use of the cathode ray tube indicator as a visual presentation means for a spectrum analyzer is undesirable because of the transient nature of the responses provided by the indicator. It is accordingly, a primary object of the present invention to provide a recording spectrum analyzer.

In the applications above referred to, considerations involving the response of the I. F. channel and other tuned circuits to transient signals produced by the frequency scanning action of a spectrum analyzer were introduced. By analogy with mechanical systems, the responses of an I. F. channel of a spectrum analyzer may be said to have inertia to transient signals, the response of the channel being determined not only by the amplitude of the signal applied thereto, but also by the sweep rate or rate of frequency scan of the signals, and by the band width of the I. F. amplifier. In the above identified applications there has been disclosed the considerations involving selection of band width and frequency sweep rate, leading to optimum responses. These considerations may now be summarized herein.

It will be realized that for extremely low rates of scanning the resolution possible with systems in spectrum analyzers of a frequency scanning type depends upon the band width of the intermediate frequency amplifier, hereinafter sometimes referred to as the frequency gate. If the frequency gate is sufficiently wide two adjacent signals will enter simultaneously and will provide a joint or undifferentiable response. Accordingly, to obtain good resolution between adjacent frequencies a relatively narrow I. F. band width is required. However, it may be desirable to sweep at a relatively rapid rate, and it is found, as the rate of sweep increases that the I. F. amplifier or frequency gate fails to respond to the full amplitude of signals as they are heterodyned into the amplifier or frequency gate, that the respond for an appreciable time after the signal I. F. amplifier or frequency gate continues to response for an appreciable time after the signals have been removed. The transient response of the amplifier or gate is, then, not sufficiently rapid to follow the rapid build up and decay of the impressed signal, and the response in the indicator broadens so that resolution is lost, and also the amplitude of the response is not a true measure of the amplitude of the input signal.

If resolution S of a panoramic spectrum analyzer be defined as the visually displayed width in terms of frequency of a single frequency signal, at points 3 db down on the display, it is found that S equals $$\sqrt{2\frac{df}{dt}}$$

where $$\frac{df}{dt}$$

equals the rate of frequency scanning in cycles per second. It is further found that to obtain optimum S in a given system, for a given rate of sweep $$\frac{df}{dt}$$

the I. F. band width must equal $$\frac{1}{1.4}\sqrt{\frac{df}{dt}}$$

If then the desired resolution is determined for any value of I. F. band width, a definite value of $$\frac{df}{dt}$$

is established, and the higher resolutions apparently obtainable by utilizing narrower band I. F. amplifiers may actually be attained only at the cost of decreased sweep rates.

It is accordingly usual in designing frequency sweeping spectrum analyzers to select an I. F. band width, and a sweep rate, which together are adapted to provide approximately a desired resolution. Where the spectrum to be analyzed is great and considerable resolution is required, the design limitations above discussed lead to a very slow repetition rate for repetitive scanning, in order to keep the scanning rate, $$\frac{df}{dt}$$

in cycles per second, at a sufficiently low value. Upon considering the problem of audio signal or audio spectrum analysis by means of frequency scanning spectrum analyzers, it will be evident that the problem of selecting a suitable band width, and a suitable I. F. sweep rate, involves extreme difficulties because of the resolution required at the low end of the audio spectrum, which must be of the order of several cycles. In order to establish a display having a resolution of several cycles the rate of scanning must be extremely low, I. E., of the order of several cycles per second, so that the process of frequency scanning a total band width of say, from 20 to 20,000 cycles requires an inordinate amount of time.

Considerations involving the inertia of the I. F. channel or frequency gate of a frequency scanning spectrum analyzer are accentuated if a recorder is to be used to provide the presentation, since such recorders involve mechanical parts which have considerable inertia, and the inertia of the mechanical indicating element of the recorder is added to the inertia of the I. F. channel. Generally, the inertia of the mechanical system may be expected to be greater in magnitude than the inertia of the electrical portion of the system, so that the above mentioned rate of scanning, i. e., of the order of several cycles per second, may, in fact, prove to be too fast to enable accurate operation of the recorder.

Upon consideration of the problem of recording spectrum analyzers, it will be clear that the rate of scanning is immaterial except in the presence of signals, and need only be sufficiently slow to enable optimum resolution while a signal is being received, the rate of sweep at other times being immaterial. This consideration was taken advantage of in application for United States patent, Serial #6,624, now United States Patent No. 2,507,525, referred to above, and is again utilized in the present invention in order to make possible a practical spectrum analyzing recorder.

Briefly described, in the present invention the audio spectrum to be analyzed is applied to a heterodyning means in the nature of a mixture circuit, to which is also applied the output of a frequency scanning local oscillator. The frequency of the local oscillator is determined by a mechanical condenser, which is varied in respect to capacity mechanically, by means of a motor. A narrow band I. F. channel is connected to the output of the mixer to provide a frequency gate for the spectrum analyzer, this gate being, in a practical system, of the order of five to ten cycles wide. The record is created on a record receiving surface which may comprise a strip of record receiving paper. The record receiving strip may be constituted of a single sheet of paper having a predetermined length, sufficient to circle once a drum which is driven by the tuning motor. The recording stylus may be arranged to trace a line parallel to the length of the strip, or to the direction of travel of the strip, in the absence of signals, and to provide deflections laterally of the strip in response to signals, and may be driven from the detected output of the I. F. channel or frequency gate.

Accordingly, for each revolution of the motor the tuning condenser tunes through a complete cycle, translating the entire audio spectrum across the I. F. channel, and simultaneously the record receiving strip is advanced longitudinally throughout its entire length by the drum on which it is mounted, the stylus providing lateral recordings indicative of the amplitude and of the frequency position of the signals in the spectrum. Since the same resolution is not required at the upper end of the spectrum as at the lower end, more rapid scanning may be utilized at the upper end, in an effort to reduce the total time per scan.

The simple system described in the previous paragraph has the defect, especially while more rapid scanning is taking place over the upper end of the audio spectrum, that signals may be scanned through at a rate too rapid to enable the recording stylus to attain a full throw before any particular signal frequency has completely scanned through the I. F. channel, keeping in mind that the I. F. channel may have a total width of the order of five or ten cycles.

In accordance with the invention, therefore, I provide, antecedent to the narrow band I. F. channel, an I. F. channel which is considerably wider than the narrow band frequency gate, say, of the order of one or two hundred cycles, and the output of this channel is applied to a brake for the motor and serves to slow the tuning to a relatively low rate just before any given signal arrives at the narrow band frequency gate, during the signal, and immediately thereafter; at all other times the rate of scan may be very high. By utilizing this expedient the total time required to scan through a complete audio band may be considerably reduced, unless a great number of frequency components are present in the band since the drum and the tuning condenser may be rotated at a relatively rapid rate except at or adjacent to values of frequency of the local oscillator such that frequency components of the spectrum to be analyzed are heterodyned into the narrow band I. F. channel.

For many purposes, and in many recording equipments, the expedient above described may be sufficient to accomplish accurate and rapid recording of audio spectrum. However, still a further expedient may be adopted to assure accurate operation. This further expedient involves the practical stoppage of the tuning and drum driving motor in the presence of a signal in the narrow band frequency gate. This stoppage may be accomplished in either of two methods, or by the application of both simultaneously.

In the first method the output of the narrow band channel, or frequency gate, is differentiated and the differentiated output applied to the brake to increase the braking force over and above the braking force otherwise present in response to signals in the wide band I. F. channel. Since the output of the narrow band I. F. channel is applied to the brake via a differentiating circuit the enhanced braking action will occur only while the output of the narrow I. F. channel is varying and accordingly only while a signal is arriving or while it is decaying. Should the output of the differentiator be so great as to cause a complete stoppage of the driving motor, there will also be a stoppage of differentiated signal which will release the brake. Accordingly, a system of this type is not capable of completely stopping the motor and stalling the action of the entire device, i. e., the system is inherently non-self locking. Alternatively or in addition, the output of the narrow band I. F. channel may be detected and applied to a relay, which may break the motor circuit and stop the motor completely in response to signal output in the narrow band I. F. channel, thereby taking full advantage of the entire band width of the narrow band I. F. amplifier, to attain a maximum response of the system completely unaffected by the fact that the system is scanning. In order to render the latter system non-self locking, the relay which operates in response to output in the narrow band I. F. channel to break the motor circuit, also breaks its own circuit, and this relay may be slow to release, and have a time constant on release sufficiently great to permit the recording stylus to complete a maximum throw before the relay again closes the motor and permits continuation of scanning.

By means of the expedients above briefly described, I have been able to construct a rapidly operating recording spectrum analyzer having resolution which is limited only by the width of the I. F. channel which it is possible to obtain by utilizing crystal filters as the band width determining element of the channel.

I have, however, enhanced the utility of the recording spectrum analyzer above described by introducing two further expedients, now briefly described. The first of these expedients enables utilization of a single strip of record receiving surface to record a plurality of successive spectra, the successive recordings being laterally displaced on the record receiving strip. I accomplish this most simply by introducing into the current responsive element of the stylus a D. C. current which is manually adjustable. If then we assume that the first record made on a record receiving strip is made adjacent to the left hand edge of the record receiving strip, a succeeding record may be made at a point displaced by one- half or one inch therefrom laterally across the strip by introducing a suitable current into the current responsive element of the stylus, and this process may be continued to establish successive recordings on lines relatively displaced laterally across the record receiving surface, and utilizing a single record receiving surface in this way for a plurality of records. Since these records may involve spectra which are related in one way or another, the use of this expedient enables a ready comparison of separate spectra recorded in separate runs.

Still a further expedient involves the driving of the record receiving surface or drum at a more rapid rate than the tuning condenser so that the record receiving drum makes an integral number of revolutions for each single revolution of the tuning condenser. The driving motor which drives the tuning condenser and the drum likewise is utilized to drive a continuously variable potentiometer, which superimposes on the audio signals applied to the current responsive element of the stylus a voltage which increases linearly with time over the entire frequency scanning cycle. Accordingly, in the absence of signals, the recording stylus traces out a spiral on the record receiving strip, and the presence of signals is represented as laterally deflected pips on the spiral base line. Utilization of this expedient enables extension of the base line on the record receiving strip. For example, the record receiving strip may be rotated six times as fast as the tuning condenser, providing a base line thereon which is six times as long as would be possible were each cycle of scanning to be recorded during a single rotation of the drum. This expedient is extremely valuable where a great many signals are present in the spectrum, which must be differentiated and accurately measured, since thereby the frequency base line in respect to which all measurements are taken is greatly extended.

It is accordingly, an object of the present invention to provide a frequency scanning spectrum analyzer wherein the spectrum analysis is provided in the form of a permanent record.

It is a further object of the invention to provide a recording spectrum analyzer in which the resolution of the analyzer is not limited by the inertial characteristics of the recorder or by the electrical characteristics of the frequency gate of the analyzer, in respect to resolution.

It is a further object of the invention to provide a system of recording spectrum analysis wherein the instantaneous rate of frequency scanning is determined by the presence or absence of signal in the analyzer at each instant.

It is still another object of the invention to provide a recording spectrum analyzer wherein a plurality of recordings may be accomplished on a single record receiving strip in such positions as to enable ready comparison of the spectra recorded.

It is still another object of the invention to provide a recording spectrum analyzer having an extremely long frequency time base to enable the very accurate analysis of frequency spectrum.

It is more broadly described as an object of the invention to provide an improved recording spectrum analyzer adapted for rapidly recording the frequency content of audio spectra at high visual resolution.

The above and still further object and advantages of the present system will become apparent upon consideration of the following detailed description of a specific embodiment thereof, especially when taken in conjunction with the accompanying drawings, wherein:

Figure 1 is a circuit diagram, partially in block form, illustrating one embodiment of the present invention;

Figure 2 is a representation in plan of a portion of a record receiving strip showing a plurality of juxtaposed records; and, Figure 3 is a representation in plan of a record receiving surface showing a spectrum analysis utilizing an extended frequency base line.

Referring now more specifically to the drawings, the reference numeral 1 denotes a source of a spectrum, which may be, for the sake of example, an audio spectrum and which may have a lower limit F1 and an upper limit F2, which may, for example, be constituted of frequencies of 20 and 20,000 cycles per second, respectively. It will, of course, be understood that the specific range of frequencies mentioned is for exemplification only, and that the principle of the present system may be applied to any desired band of frequencies.

The spectrum provided by the source 1 is applied to a mixer 2, which has the function of translating the band of frequencies F1 to F2 by means of a heterodyning process to an equivalent frequency spectrum which is more suitable for I. F. amplification. For the sake of example only, I have selected an I. F. frequency of 100 kc. and accordingly, the local oscillator 3 is tunable from 100 kc. to 120 kc. by means of a variable mechanical condenser 4. Accordingly, as the frequency of the oscillator 3 is swept over its assigned range, successive ones of the frequencies present in the spectrum provided by the source 1 are heterodyned in the mixer 2 to a frequency corresponding with 100 kc., initiating a response in the I. F. channel or filter 5. The I. F. channel 5, for purposes which will appear as the description proceeds, has a total band width of approximately 100 cycles and consequently a resolution which is, of itself, insufficient to accomplish the objects of the present invention in the lower portion of the frequency spectrum to be analyzed. The I. F. channel 5 accordingly, is followed by a further I. F. channel or filter 6, which may be of the crystal filter type, and which has a total band width of the order of 10 cycles. If we assume for the sake of example that the I. F. channel 6 has a band width of plus and minus 5 cycles, it will be clear that, if the frequency scanning process takes place at a sufficiently slow rate, any signals in the spectrum provided by the source 1 which differ by as much as ten cycles will produce individual and separate responses in the I. F. channel 6, the responses being separated in time, due to the time law of variation of the output frequency of the oscillator 3.

The output of the I. F. channel 6 is detected in a detector 7, the output of which is amplified in a suitable amplifier 8, and the output of the amplifier 8 is applied ultimately to a current responsive element 9 of a recorder 10, the current responsive element 9 serving to actuate a recording arm 9a which carries at its end a stylus 11. The stylus 11 is moved laterally with respect to a record receiving surface 12, mounted on a cylindrical drum 13, and completely encircling the drum 13 once.

Application of voltage from the audio amplifier 8 to the current responsive element 9 occurs via a circuit including a potentiometer 14, comprising a resistance element 15 arranged about the circumference of the circle, a source of potential 16 in series with the resistance element 15, and a rotating voltage pick-off arm 17.

The source of potential 16 establishes a voltage gradient along the resistance 15, and since the lead 18 deriving immediately from the audio amplifier enters the potentiometer 14 at the point 19 and leaves the potentiometer at the voltage pick-off arm 17, proceeding then via the lead 20 to the current responsive element 9, the current flowing in the element 9 is a composite current made up of the output of the audio amplifier, and of a further current determined by the angular position of the arm 17 of the potentiometer 14. The position of the arm 17 then determines the lateral position of the current responsive element 9 in the absence of signals, or the lateral position of the stylus 11 with respect to the record receiving surface 12 in the absence of signals.

The pick-off arm 17 may be manually adjustable, if desired, or may be driven via a manually releasable clutch 21, from a motor 22 which drives the drum 13 and the variable condenser 4 in time synchronism. As the motor 22 rotates, accordingly, the variable condenser 4 likewise rotates, changes the output frequency of the oscillator 3, and accordingly modifying the value of that frequency component of the spectrum under analysis which is instantaneously passing through the I. F. channel 6. Since the drum 13 is rotated in synchronism with the rotation of the condenser 4, a frequency base is established longitudinally of the record receiving surface 12, and the presence of a signal in the channel 6 effects a throw of the current responsive element 9, and consequently the stylus 11, to indicate the frequency value of that signal with respect to the frequency base line.

The position of the frequency base line laterally of the record receiving surface 12 is, however, determined by the position of the pick-off arm 17 and, accordingly, successive records may be made on successive lateral portions of the record receiving surface 12 by the simple expedient of shifting the position of the pick-off arm 17 manually to a different position for each recording.

The appearance of a record receiving strip made in accordance with this practice is illustrated in Figure 2 of the drawings, which shows four recordings numbered respectively 23, 24, 25 and 26, each of the recordings having pips 27, representative of the frequency positions of components of the spectrum 1. It will be apparent that the separate recordings may be simply and readily compared for frequency content, since all of the recordings are made with respect to precisely congruent base lines, because of the rigid mechanical coupling between the condenser 4 and the drum 13.

If desired, a different operation of the system may be accomplished by driving the drum 13 from the motor 22 via a speed change gear 28, so that the drum 13 rotates at a faster rate than the motor 22, the ratio between the speeds being an integral number.

For the sake of example we may assume that the drum 13 is caused to rotate six times as fast as the motor 22, and consequently six times as fast as the condenser 4, and accordingly, that the drum 13 makes six complete revolutions while the condenser 4 is effecting a single scan of the spectrum being analyzed. Simultaneously the pick-off arm 17 is driven via the clutch 21, which is now engaged directly with the motor 22. Accordingly, there is a substantially linear traverse of the stylus 11 laterally of the record receiving surface 12 during the span, so that the stylus 11 traces a spiral on the record receiving surface 12, considered as a cylinder. By proper selection of the values of the voltage of the source 16, of the electrical constants of the potentiometer 14, and of the constants of the current responsive element 9, stylus 11 may be caused to initiate its trace at the extreme left hand edge of the record receiving surface 12 while the pick-off arm is located at the point 19, introducing no voltage into the current responsive element 9. After the pick-off arm 17 has reached a position 29 corresponding with a complete traverse of the resistance element 15 the entire voltage available from the source 16 is applied to the current responsive element 9, and in this condition the system is adjusted so that the position of the stylus 11 is adjacent to the right hand edge of the record receiving surface 12. Since the resistance 15 provides a linear variation of voltage with variations of position of the arm 17, it will be clear that the stylus 11 traces a true spiral, and if the rate of rotation of the drum 13 with respect to the rate of rotation of the motor 22 is six to one, the spiral will contain six turns. These six turns, however, will establish one frequency base line only, corresponding to one single scan of the oscillator 3.

In order to provide optimum response in the I. F. channel 6 and in order to enable the record arm 9a to attain a full throw comparable in amplitude with the amplitude of the signal being recorded, despite the scanning action introduced by the oscillator 3, it is essential, as has been explained hereinabove, either that the scanning rate be extremely slow, if the scanning rate is to be uniform, or that the scanning rate be relatively rapid between signals and be reduced to a very low value, or stop entirely, in the presence of a signal in the I. F. channel 6. For a uniform scanning rate with an I. F. channel width of approximately ten cycles, and in order to scan a total frequency band from 20 to 20,000 cycles, or approximately a total band width of 20,000 cycles, the rate of frequency scan in cycles per second would have to be of the order of several cycles per second, and the total time required for a scan would accordingly be of the order of many minutes. This is inconvenient and undesirable and accordingly I have provided structures for slow and/or stopping action of the condenser 4 and the rotation of the drum 13 in the presence of signals, permitting a relatively rapid scanning and relatively rapid motion of the drum 13 in the intervals between signals, thereby decreasing by a very large factor the total time required for a complete scan of the spectrum involved.

In general the motor 22 will be of relatively low power, and accordingly the simplest manner of braking the motor 22 is by applying pressure to the drive shaft thereof. For this purpose, I have provided a relay responsive brake, indicated conventionally at 30, this brake being energized in the first instance from the I. F. channel 5, the output of which is detected in a detector 31, the output of the detector being amplified in an amplifier 32 and the output of the amplifier being applied directly to the relay operated brake 30. Since the I. F. channel 5 is considerably wider than the I. F. channel 6 the braking action will commence prior to the time that a signal actually appears within the I. F. channel 6, or as soon as the frequency scanning action of the oscillator 3 brings a signal into one edge of the I. F. pass band of the channel 5, and the braking action will continue after a signal has passed out of the I. F. channel 6 for the same reason. Accordingly, the motor 22 will drive the condenser 4 and the drum 13 at a given rate, say one revolution per five seconds until such time as a signal arrives within the I. F. channel 5, at which time the electro-magnetic brake 30 will be energized and the motor will be slowed down to a rate of say, one revolution per five minutes, on a temporary basis, or until the signal has swept through. After the signal has swept through, the brake 30 will be de-energized and the motor will resume rotation at its original rate.

In order to assure sufficiently slow rotation of the motor 22, operation of the brake 30 in response to the output of the I. F. channel 5 alone may prove to be insufficient for high amplitude signals, that is the motor 22 may be slowed down, but not to an extent sufficient to enable maximum optimum response of the analyzer as a whole. Accordingly, I have provided an additional brake actuating circuit deriving from the output of the I. F. channel 6, and comprising a differentiating network 33, the output of which is amplified in amplifier 32 and applied to the braking network 30. Accordingly, the braking network is subjected to two signals, which are not however operative simultaneously. The signal deriving from the differentiator and detector 33 is applied to the braking network only while the signal in the I. F. channel 6 is varying in amplitude, and accordingly is effective only while signal is applied to the current responsive element 9, or during an actual recording operation. While use of a differentiator and detector 33, as distinguished from a detector merely, is not essential, it is advisable for the following reasons. If the output of the I. F. channel 6 were applied directly after detection to the amplifier 32 without any differentiating action, then the total amplitude of the signal applied to the brakes will be proportional to the amplitude of the signal in the I. F. channel 6, and should an extremely high amplitude signal be present, the braking action might be sufficient to stop the motor completely. Should this occur, there would be no way of removing the signal from the brake 30, and the motor would remain stopped until it were manually rotated to remove signal from the I. F. channel 6. By utilizing a differentiator and detector on the other hand, a different type of operation takes place. The additional braking signal is applied to the brake 30 only while the output of the I. F. channel 6 is varying in an amplitude. Should the motor stall, this variation of signal amplitude would stop, and accordingly signal output from the differentiator and detector 33 likewise would stop, and the brake 30 would be released permitting the motor to restart automatically. Immediately the motor restarted, of course, a further braking action would be provided by the signal originating in the differentiator and detector 33.

The motor 22 would thus be permitted to edge along until it passed the point where any signal was present in the I. F. channel 6, after which the braking action would be released considerably, the motor would speed up to some intermediate value until the signal had passed through the I. F. channel 5, and thereafter the brake 30 would be completely de-energized and the motor would attain top speed. The possibility of motor locking is thus obviated.

As a further means of assuring that the motor 22 will not cause scanning of the local oscillator 3 at a rate such as to lose signals the output of the detector 7 is applied via a manually operable switch 35 to an amplifier 36, the output of which is applied over a normally closed contact 37 to a relay 38. Accordingly, the relay 38 is energized whenever signal output is present in the I. F. channel 6. The relay 38, when energized, opens normally closed contact 39, which is in series with the A. C. line which serves to supply energy to the drive motor 22. Accordingly, presence of a signal in the I. F. channel 6, which corresponds with presence of a signal at the recorder 10, causes opening of the supply line to the motor 22. Since the motor is in any event being highly braked at this time, the motor will, when its supply circuit is open, completely stop without any loss of time, and the scanning action will accordingly be completely stopped while signal exists in the channel 6. Since the motor 22 is completely stopped the response of the recorder 10 will be the maximum response possible in response to the signal applied thereto, and no inertia effect either of the I. F. channel 6 or of the recorder 10 will be effective to vary the amplitude of the recorder response.

The relay 38 if of the type which is fast to make but slow to release. Accordingly, immediately upon application of the signal thereto the relay energizes and pulls down the contact 39 and further opens the contact 37, thereby automatically de-energizing the relay 38. After a predetermined time which depends for its duration upon the design of the relay 38, the contacts 37 and 39 again close, re-energizing the motor, which then advances a small distance, but closing also the contact 37 which re-establishes a circuit for the relay 38. If the motor 22 has advanced a distance sufficient to remove signal from the channel 6 the relay 38 will remain un-energized, and the motor will continue to rotate. If, on the other hand, the original signal or a new signal is now present in the channel 6 the relay 38 will again be energized, will stop the motor again, and after a predetermined time will again permit the motor to advance by a short distance. This operation repeats until no signal is present in narrow I. F. channel 6.

Inclusion of the relay 38 in the motor control circuit may be obviated by opening the switch 35 and for many types of operation it will be found, in fact, that inclusion of the relay 38 is unnecessary. Where, however, signals of extremely high amplitude, necessitating a very high throw of the recording arm 9a, is envisaged, it is usually desirable to include the relay 38 in the circuit by closing the switch 35, in order to assure the maximum possible time for each recording operation in response to each signal present in the spectrum being analyzed.

It will be realized that variable rotatable condensers are available having any one of a number of different laws of variation of frequency with angular positions. The mechanics of instruments constructed in accordance with the present invention are greatly simplified if the condenser 4 is of character such as to vary its capacity with rotation over an entire 360° of rotation, continued rotation in the same direction thereafter resulting in repetition of the capacity variation cycle. If the instrument is to be used to analyze a relatively narrow band of frequencies, considered in terms of percentage of the mid-frequency of the band, the law of variation of capacity with the rotation of the condenser form may be linear. For use in audio spectrum analyzers, however, use of a linear law of variation of frequency with rotation is generally not advantageous, the use of a logarithmic frequency scale being far superior, since thereby each octave of the frequency spectrum analyzed may be assigned an equal extent on the frequency base line. The present system may be caused to establish a logarithmic base line by the simple expedient of properly designing the plates of the variable condenser 4, in a manner which is well known per se, and in this event it may be convenient to establish a rate of rotation of the drum 13 with respect to the rate of rotation of the condenser 4 such that one complete octave will be recorded on the record receiving surface 12 for one rotation thereof. So if the instrument is designed to provide a spectrum analysis of a spectrum having a width of six octaves, the condenser 4 may be designed to provide a frequency scan following a logarithmic law of variation of frequency with rotation, and the drum 12 may be caused to rotate at a rate six times the rotational rate of the condenser 4. The releasable clutch 21 may be engaged, to effect rotation of the pick-off arm 17 in synchronism with motion of the condenser 4, and thus to effect a spiral motion of the marker 11; and the result on the record receiving surface 12 will consist substantially of six parallel lines each of which displays in terms of lateral pips or deviations, an analysis of the frequency components of one octave of the analyzed spectrum.

While I have described one specific embodiment of my invention, in accordance with the requirements of the pertinent statutes relating to Letters Patent of the United States, it will be clear that variations of the structure and arrangement disclosed, and of its details, may be resorted to without departing from the true spirit and scope of the invention.

What I claim and desire to secure by Letters Patent of the United States is:

1. The recording spectrum analyzer for recording on a record receiving surface the relative amplitudes and the frequencies of a spectrum of frequencies to be analyzed, a filter having a pass band of predetermined width less than the width of said spectrum, means for relatively scanning said spectrum of frequencies and said filter to introduce said frequencies into said filter in time succession, said means for relatively scanning comprising a variable mechanical condenser and an electric motor for actuating said condenser, means for detecting the presence of signals passing said filter, a marker for marking on said record receiving surface, means for longitudinally moving said record receiving surface with respect to said marker in synchronism with relative scanning of said spectrum of frequencies and said filter, said means for longitudinally moving said record receiving surface comprising said electric motor, means responsive to said means for detecting the presence of signals passing said filter for actuating said marker laterally of said record receiving surface and further means responsive to the presence of signals passing said filter for reducing the rate of rotation of said motor.

2. A recording spectrum analyzer for recording on a record receiving surface the relative amplitude and the frequencies of a spectrum of frequencies to be analyzed, a filter having a pass band of predetermined width less than the width of said spectrum, means for relatively scanning said spectrum of frequencies and said filter to introduce said frequencies into said filter in time succession, means for detecting the presence of signals passing said filter, a marker for marking on said record receiving surface, means for longitudinally moving said record receiving surface with respect to said marker in synchronism with relative scanning of said spectrum of frequencies and said filter, actuating means for said marker comprising an electro-dynamometer type current measuring instrument, means for applying signals passing said filter to said current measuring instrument for actuating said marker laterally of said record receiving surface, and means for introducing selective values of marker biasing current into said current measuring instrument for determining selectively the lateral position of said marker in the absence of signals passing said filter.

3. A recording spectrum analyzer for recording on a record receiving surface the relative amplitudes and the frequencies of a spectrum of frequencies to be analyzed, a filter having a pass band of predetermined width less than the width of said spectrum, means for relatively scanning said spectrum of frequencies and said filter to introduce said frequencies into said gate in time succession, means for detecting the presence of signals passing said filter, a marker for marking on said record receiving surface, an electric motor means for longitudinally moving said record receiving surface with respect to said marker and for actuating said means for relatively scanning said spectrum of frequencies and said filter, means responsive to said means for detecting the presence of signals passing said filter for actuating said marker laterally of said record receiving surface, a further filter having a width greater than the width of said first mentioned filter and connected in cascade therewith, and means responsive to the presence of signals passing said further filter for transiently braking rotation of said electric motor.

4. A recording spectrum analyzer for recording on a record receiving surface the relative amplitudes and the frequencies of a spectrum of frequencies to be analyzed, a first filter having a predetermined pass band of width less than 10% the width of said spectrum, a second filter connected in series with said first filter and having a pass band of width less than 2% of the width of said spectrum and less than the width of said first filter, means for relatively scanning said spectrum of frequencies and said filters to introduce said frequencies into said filters in time succession, and into said first filter at a time antecedent to introduction into said second filter, means for detecting the presence of signals passing said second filter, a marker for marking on said record receiving surface, means for longitudinally moving said record receiving surface with respect to said marker in synchronism with relative scanning of said spectrum of frequencies and said filters, means responsive to said means for detecting the presence of signals passing said second filter for actuating said marker laterally of said record receiving surface, and means responsive to said means for detecting the presence of signals passing said first filter for reducing the rotational speed of said motor.

5. A recording spectrum analyzer for recording on a record receiving surface the relative amplitudes and the frequencies of a spectrum of frequencies to be analyzed, a filter having a pass band of predetermined width less than 5% of the width of said spectrum, means for relatively scanning said spectrum of frequencies and said filter to introduce said frequencies with said filter in time succession, means for detecting the presence of signals passing said filter, a cylindrical drum, means for securing said record receiving surface to the cylindrical surface of said drum, a marker for marking on said record receiving surface, current responsive means for actuating said marker, means for rotating said drum with respect to said marker in synchronism with relative scanning of said spectrum of frequencies and said filter, means responsive to said means for detecting the presence of signals passing said filter for applying current to said current responsive means for actuating said marker laterally of said record receiving surface, and means responsive to the presence of signals in said filter for braking said motor to establish substantially an optimum rate of relative scanning of said spectrum of frequencies and said filter, having regard for the width of said pass band of said filter.

6. A recording spectrum analyzer for recording on a record receiving surface the relative amplitudes and the frequencies of a spectrum of frequencies to be analyzed, a filter having a pass band of width less than 5% of the width of said spectrum, means for relatively scanning said spectrum of frequenices and said filter to introduce said frequencies into said filter in time succession, means for detecting the presence of signals passing said filter, a cylindrical rotatable drum, means for securing said record receiving surface to said cylindrical drum, a marker for marking on said record receiving surface, said means for relatively scanning said spectrum of frequencies and said filter comprising a mechanically rotatable variable condenser arranged and adapted for repetitive full 360° of rotation always in the same direction, motor means for continually rotating said condenser, means responsive to said motor for rotating said drum at a rotational rate in revolutions per second equal to an integral number times the rotational rate of said condenser in revolutions per second, current responsive means for moving said marker with respect to said record receiving surface, means for detecting the presence of signals passing said filter for applying current to said current responsive means for actuating said marker laterally of said record receiving surface, and means for inserting a continuously linearly varying current into said current responsive means during rotation of said condenser to establish a continually increasing lateral deflection of said marker independently of the pressure of signals passing said filter.

7. A recording spectrum analyzer for recording on a record receiving surface the relative amplitudes and the frequencies of a spectrum of frequencies to be analyzed, a filter having a pass band of width less than 5% of the width of said spectrum, means for relatively scanning said spectrum of frequencies and said filter to introduce said frequencies into said filter in time succession, means for detecting the presence of signals passing said filter, a marker for marking on said record receiving surface, means for longitudinally moving said record receiving surface with respect to said marker in synchronism with relative scanning of said spectrum of frequencies and said filter, means responsive to said means for detecting the presence of signals passing said filter for actuating said marker laterally of said record receiving surface, and means responsive to said means for detecting the presence of signals passing said filter, and in response to passage of each of said signals, for interrupting movement of said record receiving surface and of said means for scanning for a predetermined period.

8. In a recording spectrum analyzer having a record receiving surface, a superheterodyne receiver comprising a local oscillator and an output circuit, means for periodically sweeping the frequency of said local oscillator over a band of frequencies, means for moving said record receiving surface in synchronism with said sweeping, a marker for marking on said record receiving surface, means for actuating said marker in response to voltage derived from said output circuit, and means for transiently reducing the rate of said sweeping during actuation of said marker in response to said voltage.

9. In a recording frequency spectrum analyzer having a record receiving surface, a superheterodyen receiver comprising a local oscillator and an output circuit, means for periodically sweeping the frequency of said local oscillator over a band of frequencies to receive signals comprised in said spectrum in timed succession, means for moving said record receiving surface in synchronism with said sweeping, a marker for marking on said record receiving surface and having a normal position in the absence of voltage derived from said output circuit, means for displacing said marker from said normal position in response to each said voltage, and means for transiently reducing the rate of said sweep during each said voltage.

10. In a recording frequency spectrum analyzer for recording on a record receiving surface the relative amplitudes and the frequencies of signals contained in said spectrum, the combination comprising, means for scanning said spectrum at a predetermined normal rate of scan, said means for scanning comprising a filter and means for sweeping said spectrum past said filter to effect selection in time succession of signals at different frequencies within said spectrum, said normal rate of scan being in excess of that required to provide optimum response of said filter to said signals, means for moving said record receiving surface in synchronism with said scanning, and means for reducing the rate of scan from said normal rate to a rate suitable for providing said optimum response at least during passage of each of said signals through said filter.

11. In combination in a recording spectrum analyzer of the frequency scanning type, wherein a record is made on a record receiving surface of the relative amplitudes and frequencies of signals in a frequency spectrum, means for moving said record receiving surface in synchronism with said scanning, means for scanning in the intervals between said signals at a relatively rapid rate, and means for substantially reducing said rate at least during scanning of each of said signals.

12. In a recording spectrum analyzer of the frequency scanning type, wherein successive portions of said spectrum are introduced into a selective filter in succession by a substantially continuous frequency scanning process, wherein signals in said spectrum are recorded on a record receiving surface in respect to relative amplitudes and frequencies, and wherein an optimum rate of frequency scanning exists which is dependent on the pass band of said filter, the combination comprising means normally for frequency scanning at a rate greatly in excess of said optimum rate, and means for reducing said scanning rate at least to substantially optimum value during traverse of said selective band pass filter by each signal in said frequency spectrum.

13. In a recording spectrum analyzer of the frequency scanning type, wherein successive portions of said spectrum are introduced into a selective filter in succession by a substantially continuous frequency scanning process and wherein signals in said spectrum are recorded by a marker on a cylindrical record receiving surface in respect to relative amplitudes and frequencies, the combination comprising means for rotating said cylindrical record receiving surface relative to said marker in synchronism with said scanning at a rate sufficient to accomplish a plurality of rotations of said cylindrical record receiving surface during each scan of said spectrum, and means for relatively displacing said marker and said cylindrical record receiving surface axially of said cylindrical record receiving surface during successive rotations of said cylindrical record receiving surface.

14. In a recording spectrum analyzer of the frequency scanning type, wherein successive portions of said spectrum are introduced into a selective filter in succession by a substantially continuous frequency scanning process and wherein signals in said spectrum are recorded by a marker on a cylindrical record receiving surface in respect to relative amplitudes and frequencies, means for rotating said record receiving surface, relative to said marker in synchronism with said scanning at a rate sufficient to accomplish a plurality of rotations of said record receiving surface during each scan of said spectrum, and means for continuously relatively displacing said marker and said cylindrical record receiving surface axially of said cylindrical receiving surface during rotation thereof to generate a helical base line on said record receiving surface.

HYMAN HURVITZ.

REFERENCES CITED

The following references are of record in the file of this patent:

UNITED STATES PATENTS

| Number | Name | Date |
|---|---|---|
| 1,155,679 | Phelps | Oct. 5, 1915 |
| 1,782,525 | Allen | Nov. 25, 1930 |
| 2,087,288 | Landon | July 20, 1937 |
| 2,174,566 | Case | Oct. 3, 1939 |
| 2,277,427 | Woodsen | Mar. 24, 1942 |
| 2,422,295 | Eaton | June 17, 1947 |
| 2,444,151 | Bliss | June 29, 1948 |
| 2,485,620 | McCoppin | Oct. 25, 1949 |
| 2,496,560 | Raymond | Feb. 7, 1950 |
| 2,538,065 | Wallace | Jan. 16, 1951 |

FOREIGN PATENTS

| Number | Country | Date |
|---|---|---|
| 350,513 | Great Britain | June 15, 1931 |